United States Patent [19]

Loonen

[11] Patent Number: 5,239,567
[45] Date of Patent: Aug. 24, 1993

[54] X-RAY IMAGING SYSTEM

[75] Inventor: Antonie R. M. Loonen, Eindhoven, Netherlands

[73] Assignee: U.S. Philips Corp., New York, N.Y.

[21] Appl. No.: 800,199

[22] Filed: Nov. 27, 1991

[30] Foreign Application Priority Data

Dec. 3, 1990 [NL] Netherlands ................. 9002651

[51] Int. Cl.$^5$ ............................................. H05G 1/64
[52] U.S. Cl. ..................................... 378/99; 358/111; 378/108
[58] Field of Search ................. 378/108, 99; 358/111

[56] References Cited

U.S. PATENT DOCUMENTS

| 4,101,776 | 7/1978 | Mansfield et al. | |
| 4,628,357 | 12/1986 | Fenster | 378/99 |
| 4,703,496 | 10/1987 | Meccariello et al. | 378/99 |
| 5,003,572 | 3/1991 | Meccariello et al. | 378/108 |

*Primary Examiner*—Craig E. Church
*Attorney, Agent, or Firm*—Jack D. Slobod

[57] ABSTRACT

The invention relates to an X-ray imaging system, comprising an X-ray source for emitting an X-ray beam, a power supply unit which is connected to the X-ray source, an X-ray detector for converting the X-ray beam into an optical image, a television pick-up device for converting the optical image into a video signal, a detection device which is connected to the television pick-up device and which serves to form a control signal from the video signal, an output of the detection device being connected to the power supply unit for adjustment thereof, and a display unit which is connected to the output of the television pick-up device via an amplifier (18). When the reciprocal of the signal generated by the detection device is used as the gain factor for the amplifier, a stable brightness is obtained on the television monitor without giving rise to a light flash when the X-ray source is switched on. As a result, the duration of exposure can be reduced during medical imaging so that the dose applied is less and motional unsharpness is reduced.

14 Claims, 3 Drawing Sheets

X-RAY IMAGING SYSTEM

FIELD OF THE INVENTION

The invention relates to an X-ray imaging system, comprising an X-ray source for emitting an X-ray beam, a power supply unit which is connected to the X-ray source, an X-ray detector for converting the X-ray beam into an optical image, a television pick-up device for converting the optical image into a video signal, a detection device for applying a control signal derived from the video signal to the power supply unit, and a display unit for displaying the video signal from the television pick-up device after amplification by an amplifier.

BACKGROUND OF THE INVENTION

An X-ray imaging system of this kind is known from U.S. Pat. No. 4,101,776.

The cited Patent Specification describes an X-ray imaging system comprising two control loops. The first control loop is an automatic dose control loop which adjusts the dose generated by the X-ray source so that the mean light intensity detected by the television pick-up device is constant. From the video signal generated by the television pick-up device the detection device determines a maximum value or a mean value of the video signal within a selected measurement field of the video image. This value is applied as a control signal to the power supply unit of the X-ray source and controls the cathode of the X-ray source. Thus, for objects which differ as regards X-ray absorption there are obtained video signals which have the same mean value or peak value. The video signal is applied to a television monitor via an amplifier which forms part of the second control loop, being an automatic gain control loop. The output signal of the amplifier is applied, for example to a further detection device which determines the mean value of the video image within a measurement field within the video image. The output signal of the further detection device is applied, for example to a comparator, one input of which is connected to a reference voltage. The output of the comparator is connected to the set terminal of the amplifier so, the gain factor thus being adjusted so that the mean level of the signal applied to the television monitor is constant. As a result of the use of an automatic gain control loop, the brightness of the image on the television monitor remains constant also if, in the case of very thick objects or objects exhibiting a high radiation absorption, the automatic dose control loop cannot increase the dose to such an extent that the mean light intensity on the entrance screen of the television pick-up device is sufficient. An upper limit as regards the dose to be adjusted by the dose control loop and to be generated by the X-ray source may be imposed by the fact that comparatively thick objects produce a substantial amount of scattered radiation, thus reducing the contrast in the X-ray image so that no contrast enhancement is achieved by increasing the dose. Furthermore, the maximum loadability of the X-ray source also imposes an upper limit as regards the dose that can be adjusted. Another advantage of an automatic dose control loop occurs in the case of dynamic imaging, i.e. imaging at the instant at which the X-ray source is activated or at the instant at which an object exhibiting local differences as regards X-ray absorption is moved within the X-ray beam. In those cases the automatic dose control loop readjusts the current and the high voltage of the X-ray source until the light intensity on the entrance screen of the television pick-up device reaches a predetermined constant value. When the dose increases upon activation of the X-ray source, the automatic gain control loop also increases the gain factor for the video signal applied to the television monitor, so that an image having the desired mean brightness appears on the television monitor already during the adjustment period of the automatic dose control loop. The time constants of the automatic gain control loop and the automatic dose control loop are approximately equal and are in the order of magnitude of from 100 to 200 ms, corresponding to 2.5 to 5 frame periods of a television image where a frame is formed by two interlaced fields. The fields are displayed on the television monitor with a frequency of 50 or 60 Hz. Because the X-ray dose and the gain factor for the video signal applied to the television monitor increase simultaneously, the video signal exhibits a peak which is perceived as a disturbing flash in the X-ray image.

SUMMARY OF THE INVENTION

It is inter alia an object of the invention to provide an X-ray imaging system in which an X-ray image of good quality is quickly obtained during dynamic imaging. To achieve this, an X-ray imaging system in accordance with the invention is characterized in that the detection device is adapted to supply a control signal for adjustment of a gain factor of the amplifier.

As a result of the direct adjustment of the gain factor of the amplifier by the detection device, the video signal applied to the television monitor quickly reaches its desired mean value or peak value, substantially without the values exhibiting overshoot as occurs when the known automatic gain control loop is used. Because the video signal applied to the television monitor quickly reaches the correct value, in an X-ray imaging system in accordance with the invention the first usable X-ray images become available 0.17 s after activation of the X-ray source, as opposed to the known X-ray imaging system in which for the same circumstances the automatic gain control loop requires 0.45 s for correct adjustment of the video signal applied to the television monitor. As a result, the radiation dose applied to the object is more efficiently used; this is a major advantage in medical diagnostics considering the possible detrimental effects of X-rays on living organisms.

An embodiment of an X-ray imaging system in accordance with the invention is characterized in that an output of the detection device is connected to a divider for forming the gain factor on a divider output, which gain factor is proportional to the reciprocal of the control signal applied to the divider, the divider output being connected to the set terminal of the amplifier.

In the divider the video signal supplied by the television pick-up device, referred to hereinafter as the camera signal, is divided by a peak value or mean value determined in the detection device during a sampling period, for example during a frame period (40 ms) or a field period (20 ms). In static situations, where the mean light intensity on the entrance face of the television pick-up device is constant, a normalized video signal appears at the amplifier output. In dynamic situations, the mean values or peak values of the video signals generated by the television pick-up device during successive frame of field periods deviate from one another, so that a small deviation from the normalized video signal arises, which deviation depends on the difference in mean brightness or peak brightness between two successive frames or fields.

A further embodiment of an X-ray imaging system in accordance with the invention is characterized in that the detection device comprises at least two detection modules, an input of each module being connected to the television pick-up device, the output of a first detection module being connected to the power supply unit, the output of a second detection module being connected to the set terminal of the amplifier.

Because the automatic dose control and the gain factor for the video signal applied to the television monitor can be independently adjusted, an optimum image quality can be combined with an as low as possible does, for example by peak value detection within a measurement field in the first detection module and by detection of the mean value within a second measurement field in the second detection module. Furthermore, the control behavior of the automatic dose control loop can be adjusted by adaptation of the size and the location of the measurement field of the second detection module within the video image.

BRIEF DESCRIPTION OF THE DRAWING

Some embodiments of an X-ray imaging system in accordance with the invention will be described in detail hereinafter with reference to the accompanying drawing. Therein.

DESCRIPTION OF THE PREFERRED EMBODIMENT

Figure 1:
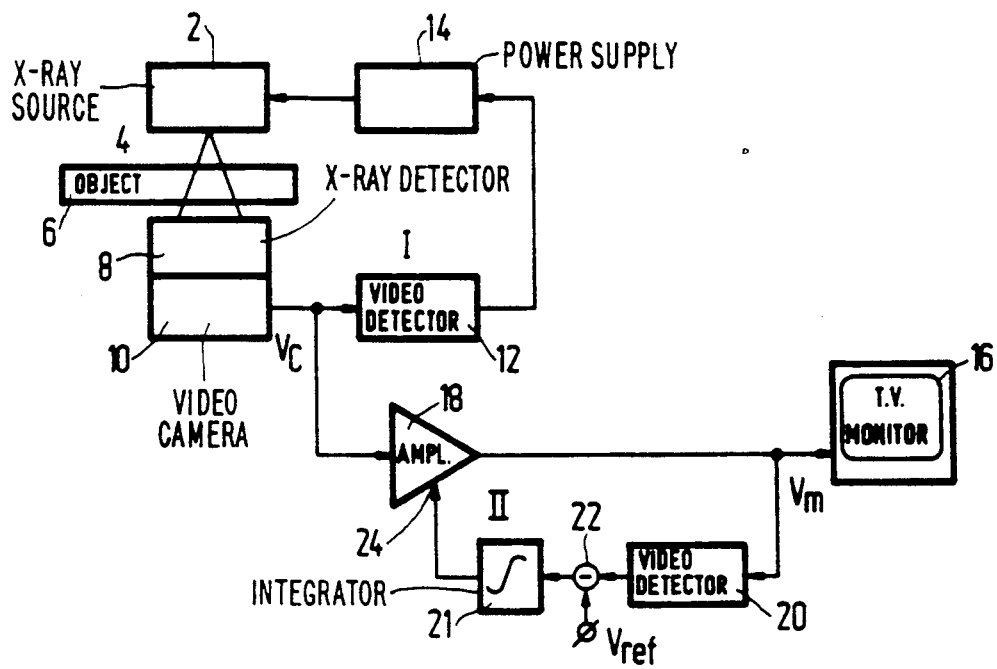
FIG. 1 diagrammatically shows a known X-ray imaging system.

FIG. 1 shows an X-ray imaging system which comprises an X-ray source 2 emitting an X-ray beam 4 which irradiates an object 6. An X-ray detector 8, preferably an X-ray image intensifier, converts the X-ray beam, locally intensity-modulated by the object 6, into an optical image which appears on an exit screen of the X-ray image intensifier. This optical image is converted into a video signal Vc by a television pick-up device, for example a video camera comprising a pick-up tube or a CCD sensor. This video signal is applied to a first detection device 12 which determines a mean value or a peak value of the video signal in a measurement field within the video image generated by the video camera 10. The control signal formed in the detection device 12 is applied to a power supply unit 14 of the X-ray source 2. When the current through the filament of the X-ray source 2 is increased, the intensity of the X-rays increases; when the high voltage of the X-ray source is increased, the electrons are accelerated faster to the anode, so that the energy and hence the penetrating power of the X-rays increases. The mean light intensity on the entrance screen of the video camera 10 is kept constant by varying the current and the high voltage of the X-ray source 2 in dependence on the thickness of the object 6 to be irradiated, which variation is between, for example 0.1 mA and 1200 mA and between 40 kV and 125 kV, respectively. Because the dose control loop I, formed by the X-ray source 2, the video camera 10, the detection device 12 and the power supply unit 14, cannot increase the X-ray dose sufficiently to keep the mean light intensity on the entrance screen of the video camera 10 constant in the case of very thick or highly radiation-absorbing objects 6, a gain control loop II is required to keep the mean brightness level of the image displayed on the television monitor 16 constant. The video signal generated by the video camera 10 is amplified by an amplifier 18. The output signal Vm of the amplifier 18 is applied to a second detection device 20 which determines a mean value or a peak value in a measurement field within the video image. Via a differential amplifier 22, the signal originating from the detection device 20 is compared with a reference voltage Vref which corresponds to a desired mean brightness level of the video image. The difference voltage originating from the differential amplifier 22 is applied, via an integrator 21, to a set terminal 24 of the amplifier 18 so that the gain factor is adapted.

Figure 2A:
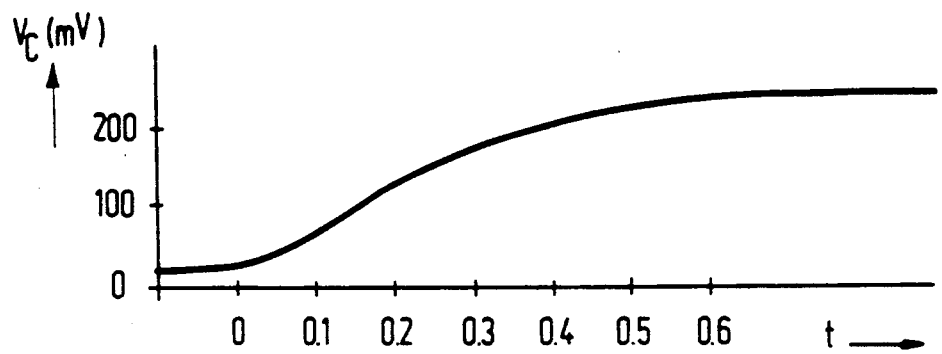
FIGS. 2a and 2b show the peak value of the video signal generated by the television pick-up device and the video signal applied to the television monitor for an increasing radiation dose in a known X-ray imaging system, FIG. 3 diagrammatically shows an X-ray imaging system in accordance with the invention.
Figure 2B:
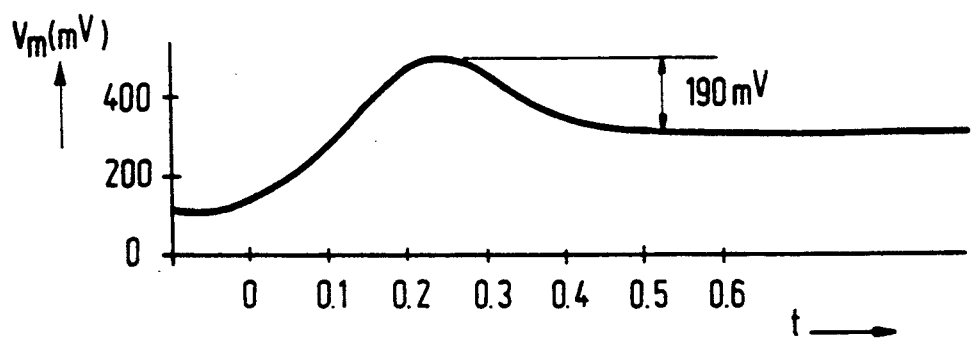

FIG. 2a shows the variation of the video signal Vc generated by the video camera 10 when the X-ray source 2 of a Philips X-ray apparatus type BV 25 is switched on. FIG. 2b shows the variation of the video signal Vm applied to the television monitor 16 when use is made of the known gain control loop II. Because the average value of the video signal Vc applied to the amplifier 18 is lower than the reference voltage Vref, the gain factor of the amplifier 18 is increased. However, because the video signal Vc from the video camera 10 increases during the period of time required by the gain control loop II to increase the gain factor, an overshoot of 190 mV occurs in the video signal Vm applied to the television monitor. This overshoot could be prevented by incorporating a greater delay in the gain control loop II. However, this has the drawback that radiation which is strongly attenuated by the object 6 cannot be used for medical imaging. Making the gain control loop II faster would cause more overshoot and would not lead to an improvement either. The response as shown in FIG. 2b occurs in the case of critical damping of the gain control loop II and is optimum for such a control loop.

Figure 3:
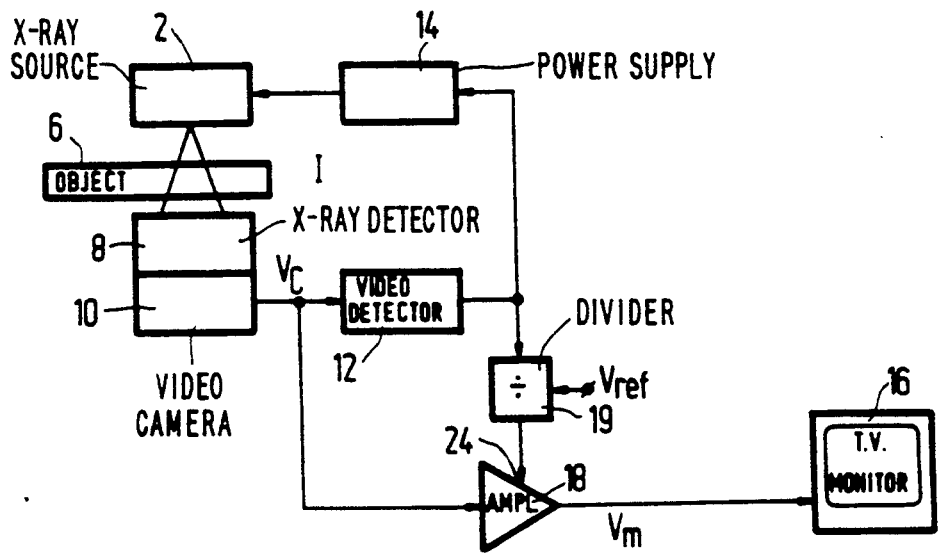

FIG. 3 shows an X-ray imaging system in which the automatic gain control loop II is replaced by a divider 19. The divider 19 forms the gain factor of the amplifier 18 by dividing the reference voltage Vref by the signal applied to the divider 19 by the detection device 12 and applies the gain factor to the set terminal 24 of the amplifier 18. During a field period a mean value or peak value of the video signal Vc is determined in the detection device 12. The video signal formed by the video camera 10 is divided by this value during the next field period. When the video signal from the video camera 10 increases, as shown in FIG. 2a, the peak values and/or the mean values of the video signal are small during the initial field periods of the video signal, so that the gain factor of the amplifier 19 becomes very high. In order to prevent this, the detection device 12 forms a predetermined threshold value on its output, for example for mean values or peak values below this threshold value. As soon as the output signal of the detection device 12 exceeds the threshold value, the mean level of the video signal Vm applied to the television monotor 16 is controlled to Vref. This is illustrated in FIG. 4.

Figure 4:
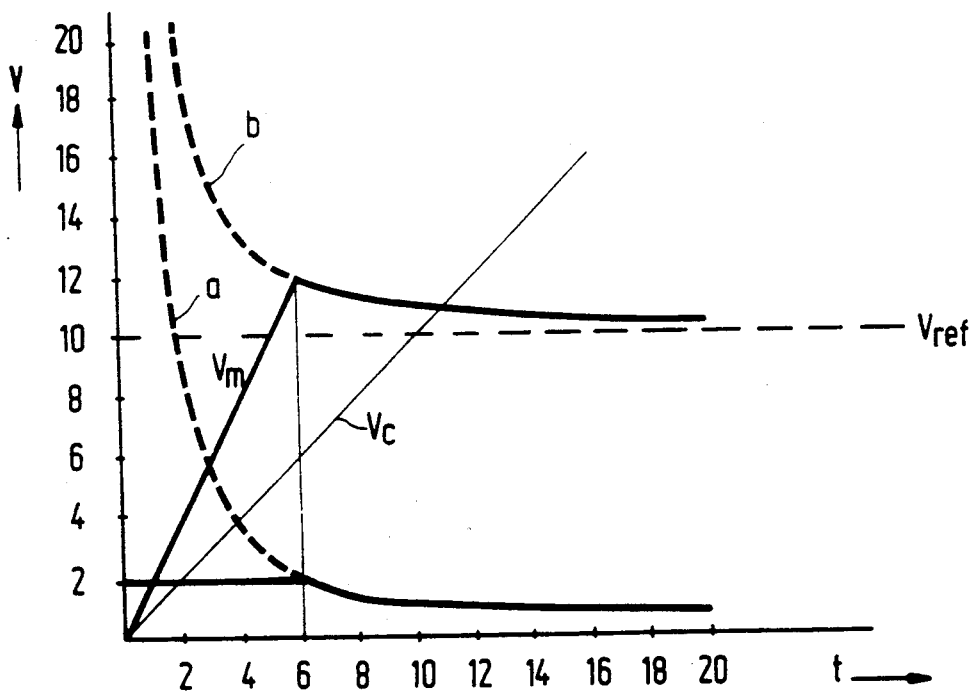
FIG. 4 shows the measure response of an X-ray imaging sytem in accordance with the invention to a linearly increasing radiation dose.

In FIG. 4 it is assumed that the mean level of the video signal Vc from the video camera 10 linearly increases as a function of time: Vc=t. In FIG. 4 the voltage is plotted as a function of time in arbitrary units. In the divider 19 the gain factor k(t) is formed by the quotient of the reference voltage Vref and the mean value or peak value measured during a preceding frame period T. In the case of uniform illumination of the entrance screen of the video camera 10, the brightness in any point of the video image is equal to the mean value and the peak value. In this case the gain factor k(t) is given by: k(t)=Vref/Vc(t-T). For a reference voltage Vref amounting to 10 V and a frame period T amounting to 1 s, k(t) is shown as a curve FIG. 4. For small values of t the gain factor k(t) tends to become infinite. If the threshold value of the detection device 12 is 5 V, the maximum gain factor in this case equals 2. For the time interval 0<t<6 s: Vm=2Vc=2t. After 6 seconds the gain factor k(t) decreases if Vref/(t-T)=10/t−1 as denoted by the non-interrupted part of the curve b in the Figure. For the signal Vm(t) applied to the television monitor 16 it then holds good that: Vm(t)=Vc(t).k(t)=10t/(t−1). As is shown in FIG. 4, after 6 seconds Vm(t) follows the non-interrupted part of the curve b. FIG. 4 shows that the video signal Vm(t) exhibits an overshoot with respect to the reference voltage Vref which is greater as the maximum gain factor of the amplifier 18 is greater (the threshold value of the detection device is then lower). For a smaller maximum gain factor (less slope of Vm(t)) less overshoot occurs, but more time is required before Vm(t) is stabilized at the level of Vref. It can also be deduced from FIG. 4 that the overshoot can be reduced by way of a shorter integration time of the detection device.

Figure 5:
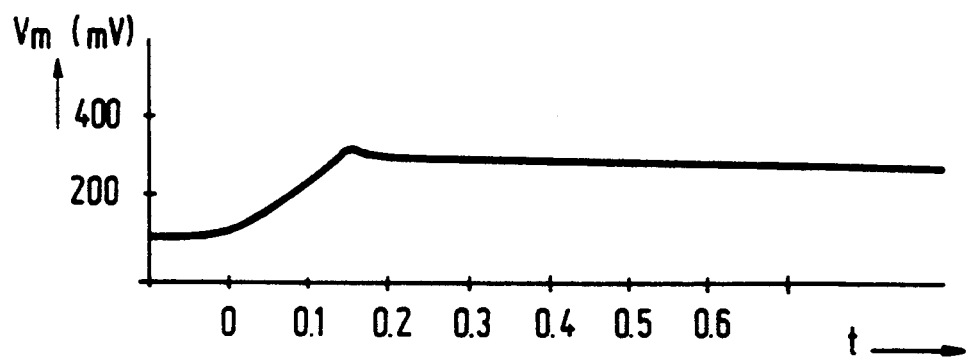
FIG. 5 shows the peak value of the video signal applied to the television monitor in an X-ray imaging system in accordance with the invention for a video signal from the television pick-up device which increases in accordance with FIG. 2a, and FIG. 6 shows a block diagram of a detection device in accordance with the invention.

FIG. 5 shows the response of the X-ray imaging system in accordance with the invention to a video signal Vc which increases according to the curve shown in FIG. 2a. After 0.17 s, the level of the video signal has been stabilized at the level Vref which amounts to 300 mV in the present case. The overshoot, amounting to 30 mV, is so small that the light flash occuring on the monitor 16 when the known gain control loop is used is now absent. It has been found that when the video signal Vm applied to the television monitor is appropriately adjusted, the exposure duration can be reduced by 36% in the so-called snapshot mode. As a result, less motional unsharpess occur in the image and the dose applied to a patient is reduced.

Figure 6:
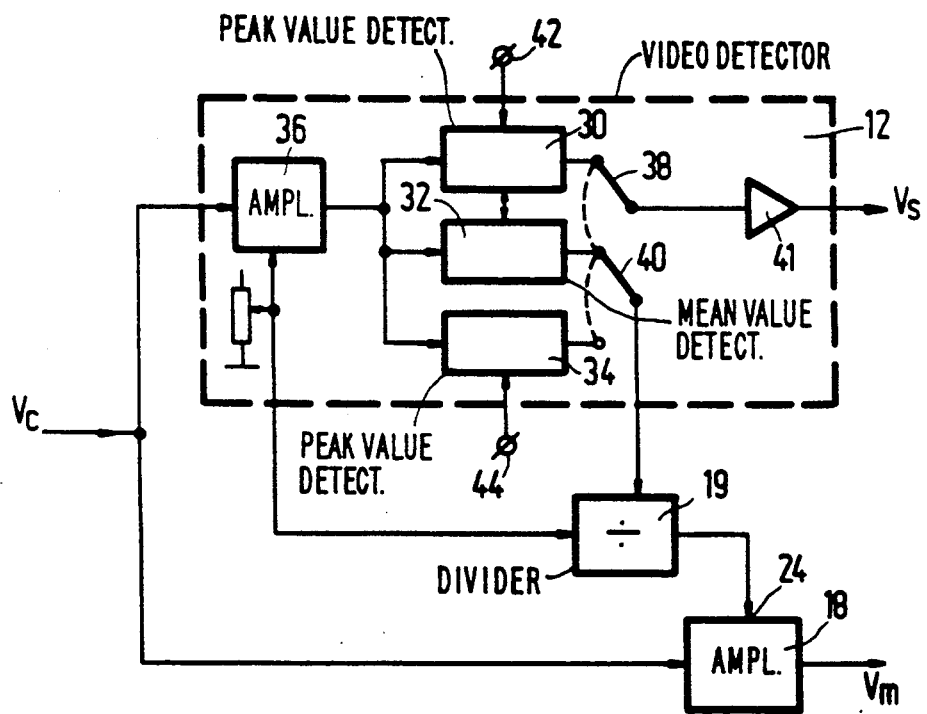

FIG. 6 diagrammatically shows the detection device 12. The detection device comprises three detection modules 30, 32 and 34, the detection module 32 being formed by a video mean value detector, the detection modules 30 and 34 being formed by video peak value detectors. The video signal Vc from the television camera 10 is applied to the detection modules 30, 32 and 34 after amplification by way of an amplifier 36 having a variable gain factor. Depending on the position of the switch 38, the signal Vs applied to the power supply unit is formed by a mean value or by a peak value. These values are determined within a measurement field of the video image, which measurement field can be adjusted via adjusting terminals 42 and 44. Depending on the position of the switch 40, the divider 19 receives a mean value or a peak value of the video signal Vc. The divider 19 forms the quotient of the gain factor of the amplifier 36 and the amplified video signal Vc, so that the reciprocal of the peak value or the mean value of the video signal Vc appears at the output of the divider 19. This value is applied to the amplifier 18 which is in this case formed by a multiplier, an input of which constitutes the amplifier set terminal 24. In the multiplier amplifier 18 the video signal Vc is divided by the mean value or the peak value, so that the video signal Vm applied to the television monitor 16 has a constant mean brightness level. The advantage of separate detection modules 30-34 resides in the fact that the control behavior of the automatic dose control loop and the adjustment behavior of the gain of the video signal Vm can be separately adapted, by selection of peak value detection or mean value detection within an adjustable measurement field, to the imaging method used, for example fluoroscopy or snapshots.

I claim:

1. An X-ray imaging system comprising:
   an X-ray source for emitting an X-ray beam;
   a power supply means having an output connected to the X-ray source for controlling a dose produced by said X-ray beam, the output of said power supply means being adjustable in response to a first control signal;
   X-ray detector means for converting the X-ray radiation from said beam into an optical image;
   television pick-up means for converting the optical image into a video signal;
   amplifier means fed by pickup means for amplifying said video signal in accordance with a gain factor which is proportionate to a second control signal;
   display means for displaying said video signal as amplified by said amplifier means;
   control signal deriving means for deriving said first and second control signals from said video signal in a manner that said first signal is proportionate to a value of said video signal and said second signal is inversely proportionate to a value of said video signal; and
   means for conveying said video signal from said pickup means to said control signal deriving means.

2. An X-ray imaging system as claimed in claim 1, wherein each value of said video signal is a mean value or a peak value.

3. An X-ray imaging system as claimed in claim 1, wherein said reference value is variable and said video signal conveying means comprises a further amplifier means having a gain factor proportionate to said reference value.

4. An X-ray imaging system as claimed in claim 3, wherein each of said first and second values of said video signal is a mean value or a peak value.

5. An X-ray imaging system as claimed in claim 1, wherein said control signal deriving means comprises first means for deriving said first control signal from a first value of said video signal and second means for deriving a third signal from a second value of said video signal different from said first value, and dividing means for deriving said second control signal by dividing a reference value by said third signal.

6. An X-ray imaging system as claimed in claim 5, wherein each of said first and second values of said video signal is a mean value or a peak value.

7. An X-ray imaging system as claimed in claim 5, wherein said reference value is variable and said video signal conveying means comprises a further amplifier means having a gain factor proportionate to said reference value.

8. An X-ray imaging system as claimed in claim 7, wherein each value of said video signal is a mean value or a peak value.

9. An X-ray imaging system comprising:
- an X-ray source for emitting an X-ray beam;
- a power supply means having an output connected to the X-ray source for controlling a dose produced by said X-ray beam, the output of said power supply means being adjustable in response to a first control signal;
- X-ray detector means for converting the X-ray radiation from said beam into an optical image;
- television pick-up means for converting the optical image into a video signal;
- amplifier means fed by pickup means for amplifying said video signal in accordance with a gain factor which is proportionate to a second control signal;
- display means for displaying said video signal as amplified by said amplifier means;
- control signal deriving means for deriving said first and second control signals from said video signal in a manner that said second control signal is proportional to the reciprocal of said first control signal; and
- means for conveying said video signal from said pickup means to said control signal deriving means.

10. An X-ray imaging system as claimed in claim 9, wherein said second control signal deriving means comprises divider means for deriving said second control signal by dividing a reference value by said first control signal.

11. An X-ray imaging system as claimed in claim 10, wherein said value of said video signal is a mean value or a peak value.

12. An X-ray imaging system as claimed in claim 10, wherein said reference value is variable and said video signal conveying means comprises a further amplifier means having a gain factor proportionate to said reference value.

13. An X-ray imaging system as claimed in claim 9, wherein said control signal deriving means comprises first means for deriving said first control signal from a value of said video signal and second means for deriving said second control signal from said first control signal.

14. An X-ray imaging system as claimed in claim 13, wherein said value of said video signal is a mean value or a peak value.

* * * * *